(12) United States Patent
Bono et al.

(10) Patent No.: US 9,779,105 B1
(45) Date of Patent: Oct. 3, 2017

(54) TRANSACTION LOGGING USING FILE-SYSTEM-SPECIFIC LOG FILES

(71) Applicant: EMC Corporation, Hopkinton, MA (US)

(72) Inventors: Jean-Pierre Bono, Westborough, MA (US); Walter C. Forrester, Berkeley Heights, NJ (US); Alexander Mathews, Jamesburg, NJ (US)

(73) Assignee: EMC IP Holding Company LLC, Hopkinton, MA (US)

(*) Notice: Subject to any disclaimer, the term of this patent is extended or adjusted under 35 U.S.C. 154(b) by 404 days.

(21) Appl. No.: 14/230,831

(22) Filed: Mar. 31, 2014

(51) Int. Cl.
G06F 7/00 (2006.01)
G06F 17/00 (2006.01)
G06F 17/30 (2006.01)

(52) U.S. Cl.
CPC .............. G06F 17/30174 (2013.01)

(58) Field of Classification Search
CPC ......... G06F 17/30088; G06F 17/30575; G06F 3/065; G06F 2201/84
USPC ........................................ 707/639
See application file for complete search history.

(56) References Cited

U.S. PATENT DOCUMENTS

| 7,631,009 | B1 | 12/2009 | Patel et al. | |
|---|---|---|---|---|
| 7,882,386 | B1 | 2/2011 | Potnis et al. | |
| 8,037,345 | B1 | 10/2011 | Iyer et al. | |
| 8,285,758 | B1 | 10/2012 | Bono et al. | |
| 8,977,898 | B1 | 3/2015 | Veeraswamy et al. | |
| 9,020,987 | B1 | 4/2015 | Nanda et al. | |
| 9,021,303 | B1 | 4/2015 | DeSouter et al. | |
| 2003/0217119 | A1* | 11/2003 | Raman | H04L 67/1095 709/219 |
| 2005/0021487 | A1* | 1/2005 | Verma | G06F 17/30067 |
| 2007/0244937 | A1* | 10/2007 | Flynn, Jr. | G06F 11/1662 |
| 2007/0283119 | A1* | 12/2007 | Sarkar | G06F 3/0605 711/170 |
| 2008/0208929 | A1* | 8/2008 | Phillipi | G06F 11/1451 |
| 2011/0016085 | A1* | 1/2011 | Kuo | G06F 17/30212 707/615 |
| 2011/0113021 | A1* | 5/2011 | Christiansen | G06F 17/30227 707/703 |
| 2012/0017037 | A1* | 1/2012 | Riddle | G06F 17/30519 711/103 |
| 2012/0173595 | A1* | 7/2012 | Salters | G06F 17/30227 707/822 |
| 2013/0219176 | A1* | 8/2013 | Akella | H04L 63/0815 713/165 |

OTHER PUBLICATIONS

Vahalia, U., et al., "Metadata in an NFS Server," EMC Corporation, 12 pages.

* cited by examiner

Primary Examiner — Hosain Alam
Assistant Examiner — Nicholas Allen
(74) Attorney, Agent, or Firm — BainwoodHuang

(57) ABSTRACT

A technique for managing transaction logging of file system metadata in a data storage system stores metadata transactions for multiple file systems of the data storage system in respective log files, such that each log file stores metadata transactions for a single file system only. The data storage system thus provides transaction log files on a per-file-system basis.

21 Claims, 5 Drawing Sheets

TRANSACTION LOGGING USING FILE-SYSTEM-SPECIFIC LOG FILES

BACKGROUND

Data storage systems are arrangements of hardware and software that may include multiple storage processors coupled to arrays of non-volatile storage devices. In typical operation, the storage processors service storage requests that arrive from client machines. The storage requests specify files of file systems, or other data elements, to be written, read, created, or deleted, for example. The storage processors run software that manages incoming storage requests and performs various data processing tasks to organize and secure client data stored on the non-volatile storage devices.

Many data storage systems employ transaction logs for temporarily persisting changes in file system metadata. For example, a data storage system may receive a request from a client machine to perform an operation (e.g., a write operation) on a file stored in a file system hosted by the data storage system. In response to receiving the request, the data storage system performs the requested operation on data of the file and computes any metadata changes to the file system that must be made to accommodate the operation. The data storage system then prepares the metadata changes in transactions and writes the transactions to a transaction log. Once the transaction log has persistently stored the transactions, the data storage system can acknowledge back to the client that the operation specified in the request is complete. Subsequently, the data storage system can sync the specified metadata changes to persistent metadata structures in the file system. The data storage system can then mark the synced transactions as available to be zeroed or overwritten at some later time, e.g., when the transaction log is running low on space. The transaction log may have a fixed length and may be arranged as a circular buffer or as some other recycling structure.

One conventional type of transaction log stores metadata changes affecting multiple file systems all together in one log. Such "common" transaction logs tag each transaction with a file system identifier (FSID) to allow data storage systems to properly identify the file system to which the respective metadata transaction should be applied.

Another conventional type of transaction log stores metadata transactions on a per-file-system basis as embedded transaction logs within metavolumes supporting respective file systems. Thus, a first metavolume may store a first file system along with an embedded transaction log specific to the first file system, whereas a second metavolume may store a second file system along with an embedded transaction log specific to the second file system.

SUMMARY

Common transaction logs involve certain deficiencies when operated in modern data storage systems. For example, common transaction logs are each common to multiple file systems and are thus not associated with any particular file system. Also, data storage systems generally store common transaction logs separately from any file system they host. Consequently, circumstances can arise in which a common transaction log stores transactions for a file system and the data storage system attempts to replay the transactions even though the file system is offline. This can occur, for example, following a system panic. If metadata transactions are removed from the log after the failed replay operation, the transactions may be irretrievably lost, as the transactions have already been removed from the log and the client may already have been acknowledged. Also, common transaction logs can complicate data replication schemes because file systems may have transactions pending in a common transaction log when snaps and/or other replication events occur, causing replicas to assume unknown and likely corrupted states.

Embedded transaction logs can address these deficiencies and provide an excellent solution for modern data storage systems. As embedded transaction logs reside in the same metavolumes as their respective file systems, it is unlikely that a file system could be offline at the same time that its transaction log is online. Thus, embedded transaction logs typically avoid the above-described metadata loss. Also, since embedded transaction logs reside in the same underlying metavolumes as those that store their respective file systems, replication events performed on metavolumes are always consistent. For example, even if transactions are pending in an embedded transaction log when a replication event occurs, the pending transactions will be replicated to a destination along with the file system, resulting in a consistent replica at the destination.

Unfortunately, however, not all data storage systems can support embedded transaction logs, as embedded transaction logs typically require particular file system formats, which are not yet ubiquitous. What is needed, therefore, is a solution that overcomes the deficiencies of common transaction logs without requiring transaction logs to be embedded in file system metavolumes.

An improved technique overcomes the above-described deficiencies of common transaction logs without requiring embedded logs by storing metadata transactions for multiple file systems of a data storage system in respective log files, such that each log file stores metadata transactions for a single file system only. The data storage system thus provides transaction log files on a per-file-system basis.

In some examples, the data storage system realizes file systems in the form of container files, which the data storage system stores within one or more container file systems of the data storage system. A "container file" is a file that itself contains and encapsulates one or more files." The data storage system may also store transaction log files (e.g., as container files or other types of files) in the container file systems. In a particular example, a data storage system stores both a file system and the transaction log that supports it as respective files in a container file system. In such arrangements, both the file system and its transaction log reside in the same fault domain, as both are supported by the same underlying hardware and software structures. If a system failure occurs which causes the file system to go offline, the same failure will very likely also cause the transaction log supporting the file system to go offline. Thus, the above-described metadata loss that can occur with common transaction logs is mitigated or avoided altogether. Also, techniques are disclosed herein to make file systems consistent during file system replication. Thus, the above-described complications that arise during replication with common transaction logs are similarly avoided. Such benefits can be enjoyed without requiring file systems to support embedded logs.

The improved technique hereof also enables replication between file systems employing file-system-specific log files, as disclosed herein, and those employing conventional common transaction logs. Indeed, there may even be benefits in some circumstances to using file-system-specific log files with file systems that support embedded logs.

Certain embodiments are directed to a method of managing transaction logging for file system metadata in a data storage system. The method includes, in response to operating a first file system in the data storage system, generating a first set of transactions describing changes in metadata of the first file system, and, in response to operating a second file system in the data storage system, generating a second set of transactions describing changes in metadata of the second file system. The method further includes persisting the first set of transactions but none of the second set of transactions to a first log file in the data storage system, the first log file located outside the first file system. The method still further includes persisting the second set of transactions but none of the first set of transactions to a second log file in the data storage system, the second log file located outside the second file system.

Other embodiments are directed to a data storage system constructed and arranged to perform the method described above. Still other embodiments are directed to a computer program product. The computer program product includes one or more computer-readable media. The media store instructions which, when executed on a set of processing units of the data storage system, cause the set of processing units to perform the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. The drawings are not necessarily to scale, emphasis instead being placed upon illustrating the principles of various embodiments of the invention. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing transaction logging of file system metadata in a data storage system stores metadata transactions for multiple file systems of the data storage system in respective log files, such that each log file stores metadata transactions for a single file system only. The data storage system thus provides transaction log files on a per-file-system basis.

Figure 1:
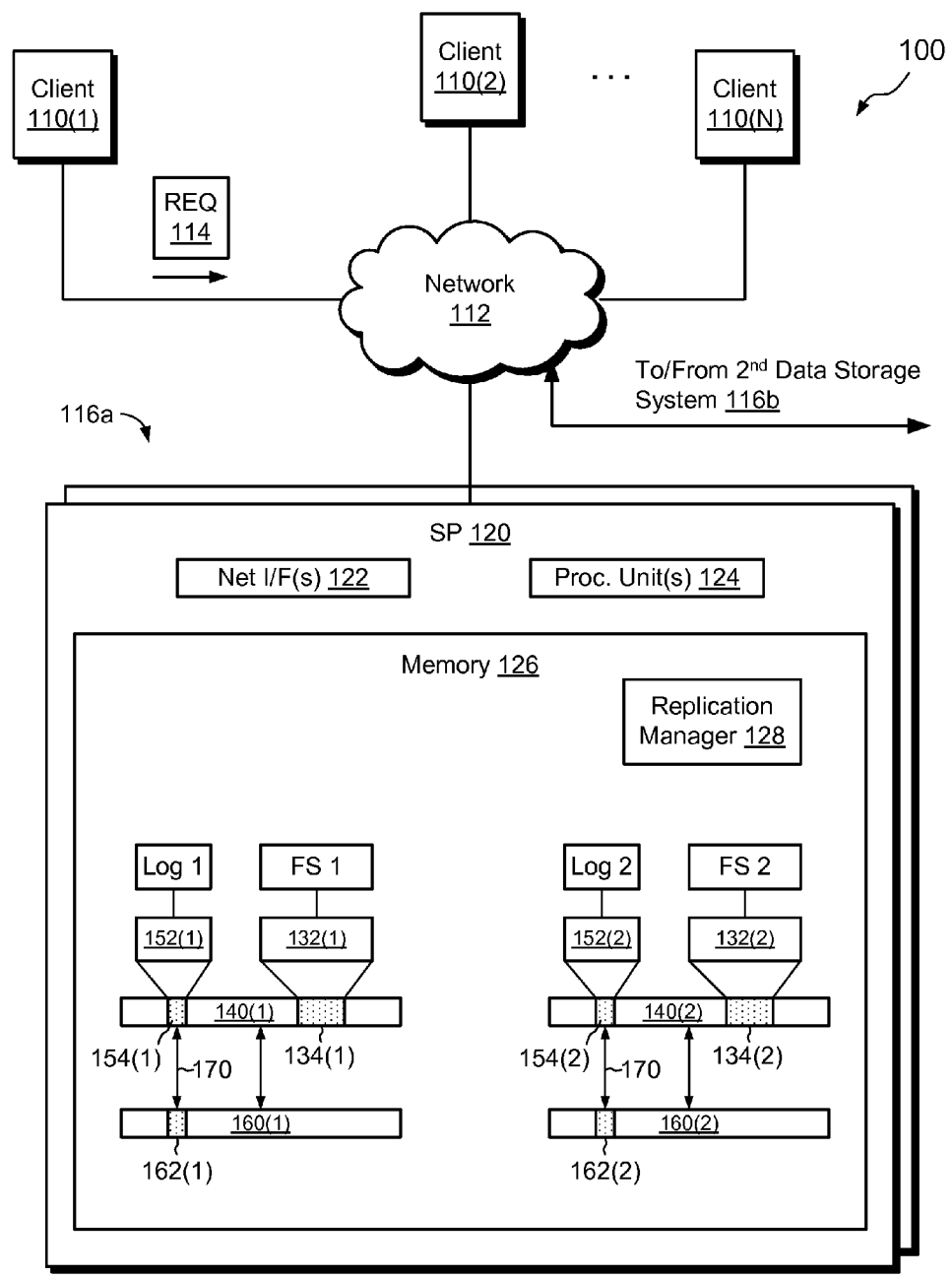
FIG. 1 is a block diagram of a first data storage system in an example environment in which embodiments hereof can be practiced.

FIG. 1 shows an example environment 100 in which embodiments of the improved technique hereof can be practiced. Here, multiple client machines 110(1) through 110(N) connect to a first data storage system 116a over a network 112. The network 112 is typically the Internet, but the network 112 may be implemented using a WAN (Wide Area Network), a LAN (Local Area Network), a high-speed interconnect, such as InfiniBand, or any combination of the foregoing, for example.

The data storage system 116a is seen to include one or more storage processors 120. The storage processor 120 includes one or more network interfaces 122, a set of processing units 124 (i.e., one or more processing cores, chips, and/or assemblies), and memory 126. Other storage processors in the data storage system 116a (if there are any) may be configured in a similar manner. The memory 126 includes both volatile memory (e.g., RAM) and non-volatile memory, such as one or more disk drives, solid state drives and the like. The set of processing units 124 and the memory 126 together form control circuitry, which is constructed and arranged to carry out various methods and functions as described herein. Also, the memory 126 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 126 typically includes many other software constructs, which are not shown, such as an operating system and various applications, processes, and daemons. Also, although the software constructs are seen as being stored within the memory 126, which is shown as being enclosed within the storage processor 120, it is understood that the memory 126 may extend outside the storage processor 120 to include external storage devices and/or arrays.

As seen in FIG. 1, the memory 126 includes software constructs for realizing a replication manager 128 and multiple file systems, such as FS 1 and FS 2. The file systems FS 1 and FS 2 are built upon respective container file systems 140(1) and 140(2). These container, or "lower-deck," file systems are internal file systems realized within an IO stack of the storage processor 120. Although only two container file systems 140(1) and 140(2) are shown, it is understood that any number of container file systems may be provided, for supporting any number of file system. In an example, the storage processor 120 may support tens or hundreds of file systems. Each container file system is itself supported by a respective underlying storage volume (e.g., a sparse volume). For example, underlying volumes 160(1) and 160(2) respectively support container file systems 140(1) and 140(2). In an example, the underlying volumes 160(1) and 160(2) are themselves logical volumes composed from storage units (e.g., slices) obtained from a storage pool and formed from multiple physical storage devices. Additional information about container file systems and their construction may be found in copending U.S. patent application Ser. No. 14/041,191, filed 30 Sep. 2013, the contents and teachings of which are hereby incorporated by reference in their entirety.

Looking at the container file systems 140(1) in greater detail, it is seen that the container file system 140(1) includes two files, a first file 134(1) and a second file 154(1). The first file 134(1) is a container file, i.e., a file that itself contains and encapsulates one or more files. In this case, the first file 134(1) contains and encapsulates the entire file system FS 1, including all of its data and metadata. The second file 154(1) (Log 1) may also be realized as a container file, but this is not required. For example, the second file 154(1) may be realized with an ordinary file or some other type of file. The second file 154(1) stores a metadata transaction log dedicated to FS 1.

The storage processor 120 expresses the first file 134(1) as the file system FS 1 via mapping, which mapping may include intermediately expressing the first file 134(1) as a file system metavolume 132(1). Similarly, the storage processor 120 may express the second file 154(1) as Log 1 via a mapping, which may include intermediately expressing the second file 154(1) as a log metavolume 152(1). In some examples, however, no log metavolume 152(1) is needed, and the storage processor 120 expresses Log 1 in a more direct manner. It is understood that the metavolume 132(1) supports FS 1 but no other file system besides FS 1. Thus, there is a one-to-one relationship between file system metavolumes and the underlying file systems they support.

In some examples, the storage processor 120 maps the second file 152(1), which realizes the transaction log for FS 1, to a contiguously addressable range 162(1) of storage within the underlying storage volume 160(1). In an example, the contiguously addressable range 162(1) may be 64 MB long, or some other fixed length. In some examples, mapping between the second file 152(1) and the underlying volume 160(1) may be established (e.g., initially or permanently) via a computationally-based, direct-mapping scheme 170, such that the storage processor 120 performs a predetermined computation to compute offsets into the contiguously addressable range 162(1) based on offsets into the second file 154(1). The directly-mapped storage underlying the second file 152(1) helps to promote fast, efficient, and predictable access to the transaction log. It should be understood, however, that direct mapping is not required.

It can be seen that FS 1 and its transaction log, Log 1, share the same container file system 140(1), the same underlying storage volume 160(1), and consequently many other underlying software and hardware structures. As they share a common set of structures, FS 1 and Log 1 occupy the same fault domain within the first data storage system 116a. Thus, if a fault occurs on the storage processor 120 that affects FS 1, the same fault will also likely affect Log 1, and vice-versa. It is thus unlikely that metadata transactions for FS 1 could become irretrievably lost because any fault that makes FS 1 unavailable will also generally make Log 1 unavailable. If FS 1 malfunctions, e.g., due to a system panic, Log 1 will most likely also malfunction, and thus the two will malfunction together and consistently. When the fault that caused FS 1 to malfunction is resolved and FS 1 is brought back online, Log 1 will also be brought back online, and FS 1 can resume in a consistent state. A common source of metadata corruption is therefore avoided.

The structures for supporting FS 2 and its associated transaction log, Log 2, are constructed, arranged, and operated similarly to the corresponding structures for FS 1 discussed above, and they provide similar benefits. Thus, the file system metavolume 132(2) for FS 2, the log metavolume 152(2) for Log 2, the first and second files 134(2) and 154(2), the underlying volume 160(2), and the contiguously addressable space 162(2), for FS 2 are built and operated in a similar way to the corresponding structures already described in connection with FS 1.

Although providing each log file in the same container file system with the respective file system that it supports can confer many benefits, providing these structures together in this way should not be regarded as required. For example, in alternative arrangements, log files for different file systems can all be stored together, e.g., in a single container file system dedicated for storing log files. Also, log files can be stored in container file systems or elsewhere without regard to where their respective file systems are stored. Many arrangements are contemplated.

In some examples, for efficiency, the container file systems 140(1) and 140(2) are each arranged to store only a single file system in the form of a container file. Thus, the container file system 140(1) stores container file 134(1) for FS 1, but stores no container files for implementing any other file systems.

In example operation, the first data storage system 116a operates file systems FS 1 and FS 2 by receiving and processing requests (e.g., request 114) from clients 110(1) to 110(N) over the network 112. In response to the requests, the first data storage system 116a processes the requests to read and/or write data to files within the file systems FS 1 and FS 2, to mount and dismount the file systems FS 1 and FS 2, and to perform other operations. As the data storage system 116a performs these operations, the storage processor 120 generates metadata changes that accompany the operations (e.g., allocate block, de-allocate block, write to inode, change indirect block, etc.) and persists the metadata changes to the respective transaction log files. For example, the storage processor 120 generates metadata transactions pertaining to FS 1 and persists the generated transactions for FS 1 to Log 1. Likewise, the storage processor 120 generates metadata transactions pertaining to FS 2 and persists the generated transactions for FS 2 to Log 2. It should be understood that each log file persists transactions for one and only one file system, i.e., the respective file system to which it is assigned.

Figure 2:
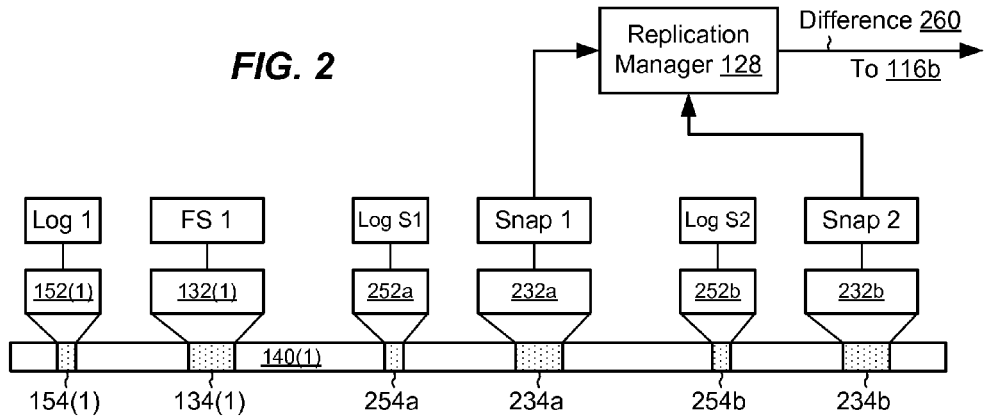
FIG. 2 is a block diagram showing an example container file system of the first data storage system of FIG. 1 after a snap has been generated of a container file realizing a file system.
Figure 3:
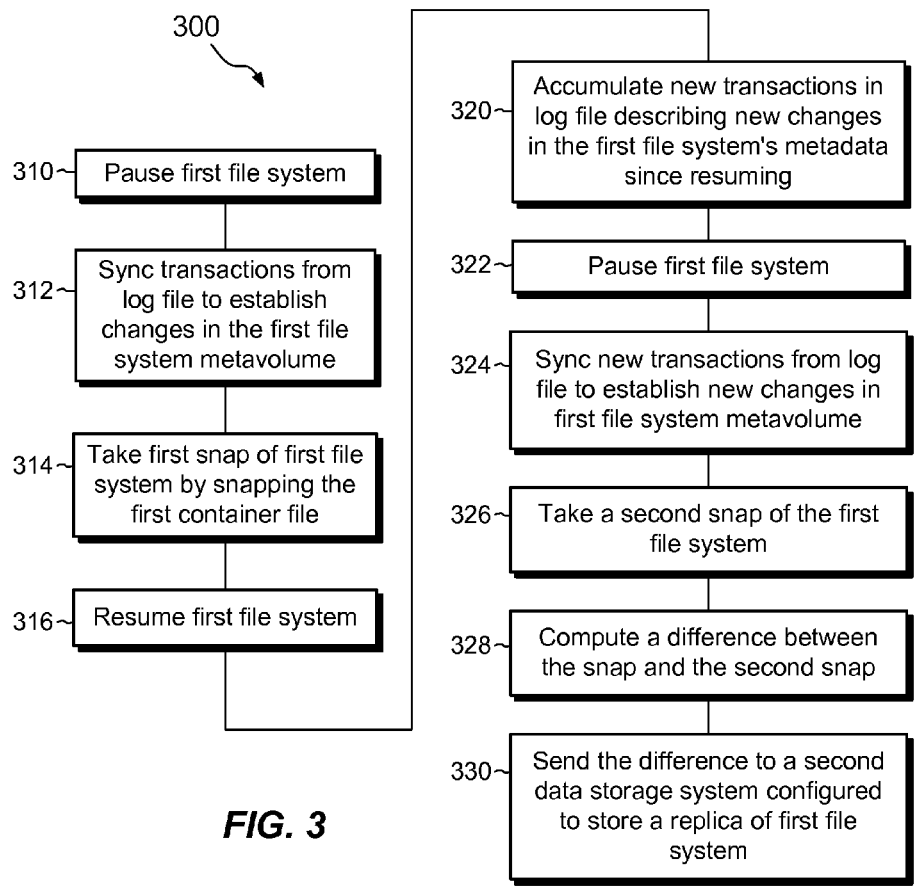
FIG. 3 is a flowchart showing an example process for snapping and asynchronously replicating the file system of FIG. 2 that includes processing transactions pending in a file-system-specific transaction log file.

FIGS. 2 and 3 show an example arrangement (FIG. 2) and process 300 (FIG. 3) for snapping file systems and for asynchronously replicating file systems to a second data storage system 116b. FIGS. 2 and 3 illustrate these activities using, as an example, the file system FS 1 in container file system 140(1); however, the activities shown and described may be applied to any file system.

FIG. 2 shows a first snap (Snap 1) and a second snap (Snap 2), which may have been taken at the direction of the replication manager 128, for example. In the example shown, snaps Snap 1 and Snap 2 are structured the same way as file systems, i.e., with underlying container files 234a and 234b and metavolumes 232a and 232b, respectively. In some examples, each snap has its own respective transaction log file, which is separate from the transaction log file supporting the primary file system. For example, Snap 1 has a log file Log S1 and Snap 2 has a log file Log S2. Log S1 is supported by file 254a and (optionally) the metavolume 252a, whereas Log S2 is supported by file 254b and (optionally) the metavolume 252b. Although a different transaction log file may be provided for each snap, it should be understood that the log files of snaps are not snaps themselves. Rather, each log file for a snap, e.g., Log S1 and Log S2, is its own transaction log created for the purpose of tracking metadata changes affecting its respective snap. As with file systems, snaps of file systems have a one-to-one relationship with respective transaction log files, with each transaction log file storing transactions for one and only one snap.

FIG. 3 shows an example process 300 for snapping a file system (FS 1 in this example) and for performing asynchronous replication using snaps. In an example, the process 300 may be carried out by the storage processor 120, e.g., acting through the replication manager 128 and/or other software constructs. The acts of the process 300 may be conducted in any suitable order, even in orders different from those illustrated, and some acts may be performed simultaneously.

At step 310, the storage processor 120 pauses the operation of the first file system FS 1 to prepare to take a snap. For example, the storage processor 120 may temporarily queue requests 114 arriving from client machines 110(1) to 110(N) to prevent them from propagating to FS 1 and to prevent new metadata changes for Log 1 from being generated, thus leaving FS 1 in a stable state.

At step 312, the storage processor syncs in place the transactions pending in Log 1 to establish corresponding changes in the file 134(1), as expressed in the file system metavolume 132(1). Syncing the transactions in place involves writing the transactions directly to metadata structures within the file 134(1), e.g., by reading metadata structures from the file 134(1), modifying the structures the reflect the specified metadata changes, and writing the modified metadata back to the file 134(1) in the same locations from which they were read. Once all pending transactions have been synced in place, FS 1 assumes a consistent state, as the metadata for FS 1 has been made current within the container file 134(1) and corresponding file system metavolume 132(1). Also at this time, the log can be zeroed out or transactions in the log file can be marked as available to be zeroed or overwritten at some later time, e.g., when Log 1 is running low on space.

At step 314, the storage processor 120 takes a first snap (Snap 1) of the file system FS 1. As FS 1 is merely an expression of container file 134(1), the storage processor 120 may generate Snap 1 by snapping the underlying container file 134(1). The storage processor 120 may then create a new log file (Log S1) for Snap 1.

At step 316, once Snap 1 has been taken, the storage processor may resume, i.e., un-pause, operation of FS 1 and release any pending requests 114. FS 1 then continues to operate as before.

If taking a snap is all that is desired, then the process 300 may be stopped at this point. However, if it is desired to perform an asynchronous replication of FS 1, the process 300 may continue to steps 320 through 330.

At step 320, with operation of FS 1 resumed, Log 1 accumulates new transactions, e.g., in response to newly arriving requests 114 and/or other events, and FS 1 is updated to reflect changes in underlying data (e.g., changes in files and directories).

At step 322, which occurs at some later time, the storage processor 120 again pauses the operation of FS 1 (e.g., in a manner similar to that described above) to prepare to take another snap.

At step 324, after FS 1 has been paused to suspend new operations against the file system, the storage processor 120 syncs in place the new transactions pending in Log 1 to establish corresponding changes in the file 134(1), as expressed in the file system metavolume 132(1). Once the new transactions have been synced in place, FS 1 again assumes a consistent state, as the file 134(1) reflects all current values of metadata.

At step 326, with FS 1 being in a consistent state, the storage processor 120 takes a second snap (Snap 2). The storage processor 120 may then create a new log file (Log S2) for Snap 2.

At step 328, the storage processor 120, e.g., acting through the replication manager 128, computes a difference 260 (FIG. 2) between Snap 1 and Snap 2. The replication manager then sends the difference 260 to the second data storage system 116, which has been configured to store a replica of FS 1.

Figure 4:
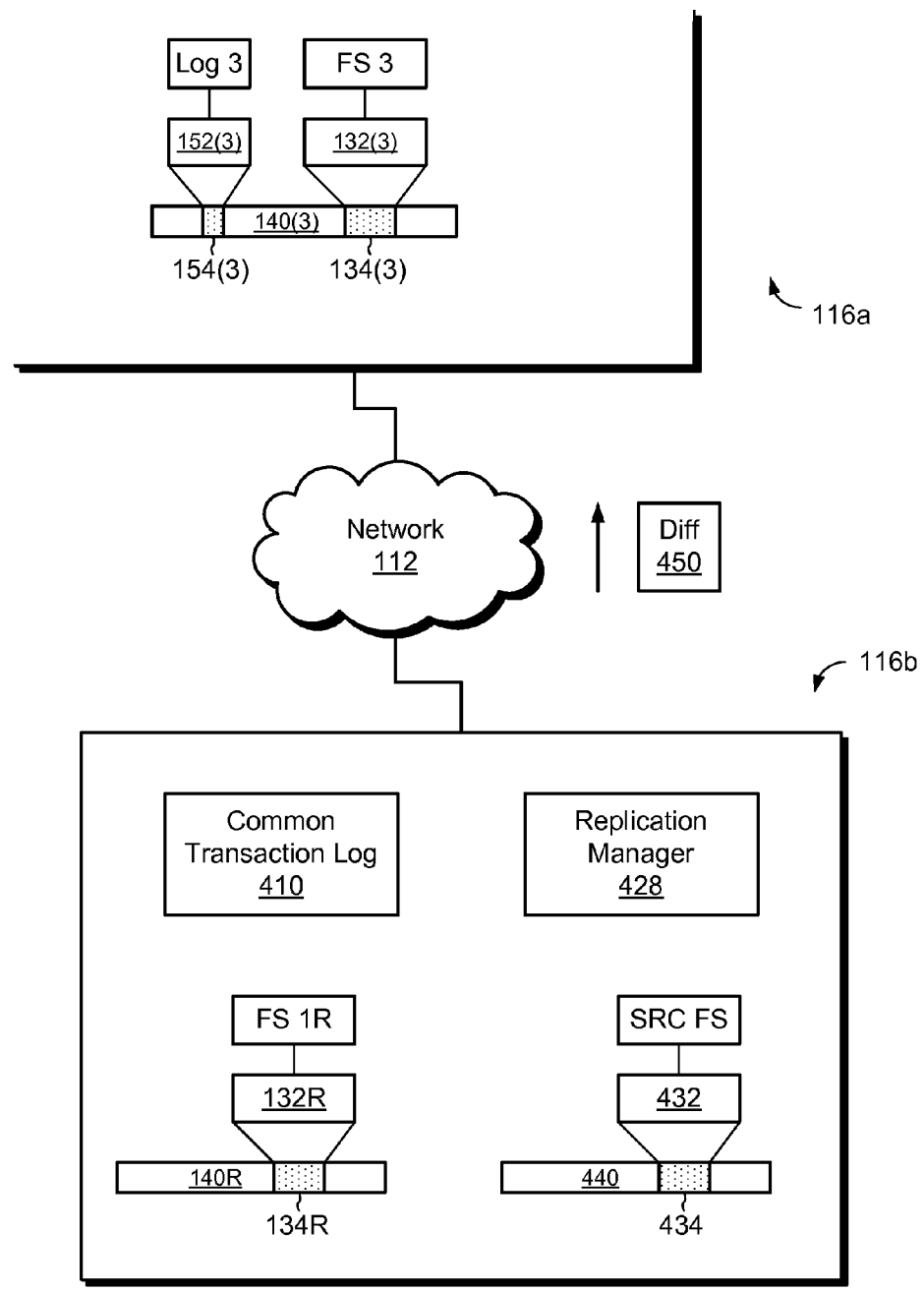
FIG. 4 is a block diagram showing additional example constituents of the first data storage system and example constituents of the second data storage system.

FIG. 4 shows portions of the first data storage system 116 and the second data storage system 116b in greater detail. Here, it is seen that the second data storage system 116b stores a file system FS 1R, which is the above-described replica of FS 1 from the first data storage system 116a. In an example, the second data storage system 116b supports FS 1R in a manner similar to the way the first data storage system 116a supports FS 1. For example, FS 1R is stored as a container file 134R in a container file system 140R and is expressed through a file system metavolume 132R.

The second data storage system 116b may host additional file systems, and such file systems need not all be replicas. For example, the second data storage system 116b may host a file system SRC FS, which can be a source file system rather than a replica. SRC FS may similarly be stored as a container file 424 in a container file system 440 and may be expressed through a file system metavolume 432.

In an example, the second data storage system 116b also includes a replication manager 428, which manages replication on behalf of the second data storage system 116b. The replication manager 428 may communicate with the replication manager 128 in the first data storage system 116a to coordinate replication sessions conducted between the first data storage system 116a and the second data storage system 116b.

In the example shown, the second data storage system 116b further includes a common transaction log 410. Unlike the file systems of the first data storage system 116a, which employ file-system-specific log files (e.g., Log 1 and Log 2), the file systems of the second data storage system 116b employ a conventional common transaction log. The common transaction log 410, like the ones described previously, stores pending metadata transactions for different file systems altogether in one structure, with individual metadata transactions tagged with respective FSIDs. In an example, the common transaction log 410 is implemented on a volume of the second data storage system 116b distinct from volumes supporting the file systems FS 1R and SRC FS.

It should be understood that the second data storage system 116b may otherwise be constructed, arranged, and operated in manner similar to that described above for the first data storage system 116a. For example, the second data storage system 116b has network interfaces, a set of processing units, and memory, which, although not shown, are understood to be present.

FIG. 4 also shows additional aspects of the first data storage system 116a. Here, for example, a third file system FS 3 can be seen, along with a corresponding log file, Log 3. As shown, FS 3 is realized as a container file 132(3) in a container file system 140(3) and may be expressed through a file system metavolume 132(3). Likewise, Log 3 is realized as a file 154(3) and may (optionally) be expressed through a log metavolume 152(3).

In an example, the first data storage system operates FS 3 as a replica of SRC FS on the second data storage system 116b. Thus, just as FS 1R provides a replica of FS 1, so too does FS 3 provide a replica of SRC FS. As these examples illustrate, replication may take place between data storage systems that use file-system-specific log files and data storage systems that use common transaction logs. By applying the above-described process of pausing a file system, syncing in place its pending transactions to render the file system in a consistent state, and snapping the file system once the file system has been made consistent, asynchronous replication can be conducted between systems that use file-system-specific log files and systems that use common transaction logs, in either direction.

Figure 5:
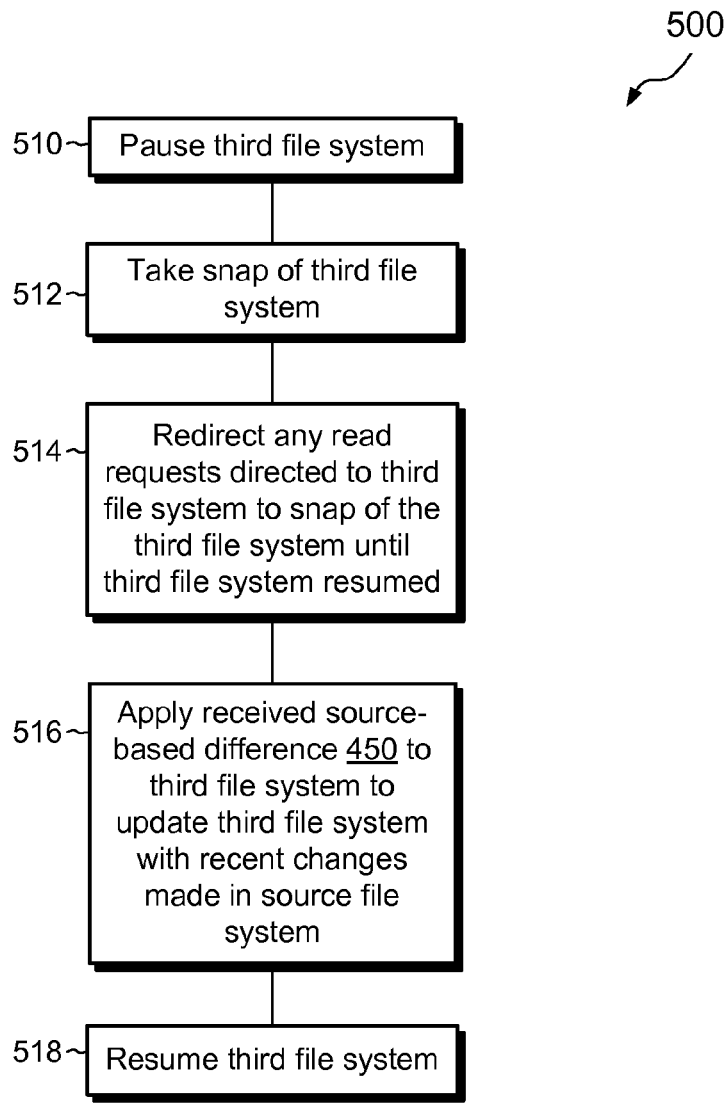
FIG. 5 is a flowchart showing an example process for applying, at the first data storage system, a difference between snaps taken at the second data storage system.

FIG. 5 shows an example process 500 for performing asynchronous replication from SRC FS on the second data storage system 116b to FS 3 on the first data storage system 116a. The process 500 thus shows an example wherein asynchronous replication can be conducted from a system that uses a common transaction log 410 to one that uses file-system-specific transaction logs (e.g., Log 1, Log 2, and Log 3). The process 500 may be carried out, for example, by storage processor 120 in the first data storage system 116a by the replication manager 128 and/or other software constructs and is operated in accordance with a replication session involving the first data storage system 116a and the second data storage system 116b. The acts of the process 500 may be conducted any suitable order, even in orders different from those illustrated, and some acts may be performed simultaneously. Prior to starting the process 500, the second data storage system 116 may already have started replicating SRC FS, e.g., by taking a pair of snaps, computing their difference 450 (FIG. 4), and sending the difference 450 to the first data storage system 116a.

At step 510, the storage processor 120 pauses the third file system, FS 3, e.g., in a similar manner to that described above in connection with FS 1 in FIG. 3. Pausing FS 3 has the effect of placing FS 3 in a stable state.

At step 512, the storage processor 120 takes a snap of FS 3. The purpose of snapping FS 3 is to allow client machines 110(1) to 110(N) to continue accessing FS 3, via its snap, in read-only mode while replication activities take place.

At step 514, any read requests 114 directed to FS 3 are redirected to its snap, such that clients suffer no disruption.

At step 516, the storage processor 120 applies the difference 450, which has been received from the second data storage system 116, to FS 3 to update FS 3 with recent changes to SRC FS.

At step 518, once the difference 450 is applied, the storage processor 120 resumes operation of FS 3, e.g., by directing read requests previously redirected to the snap back to FS 3.

It has thus been shown that asynchronous replication can be conducted, in either direction, between systems that use file-system-specific log files and systems that use common transaction logs.

Figure 6:
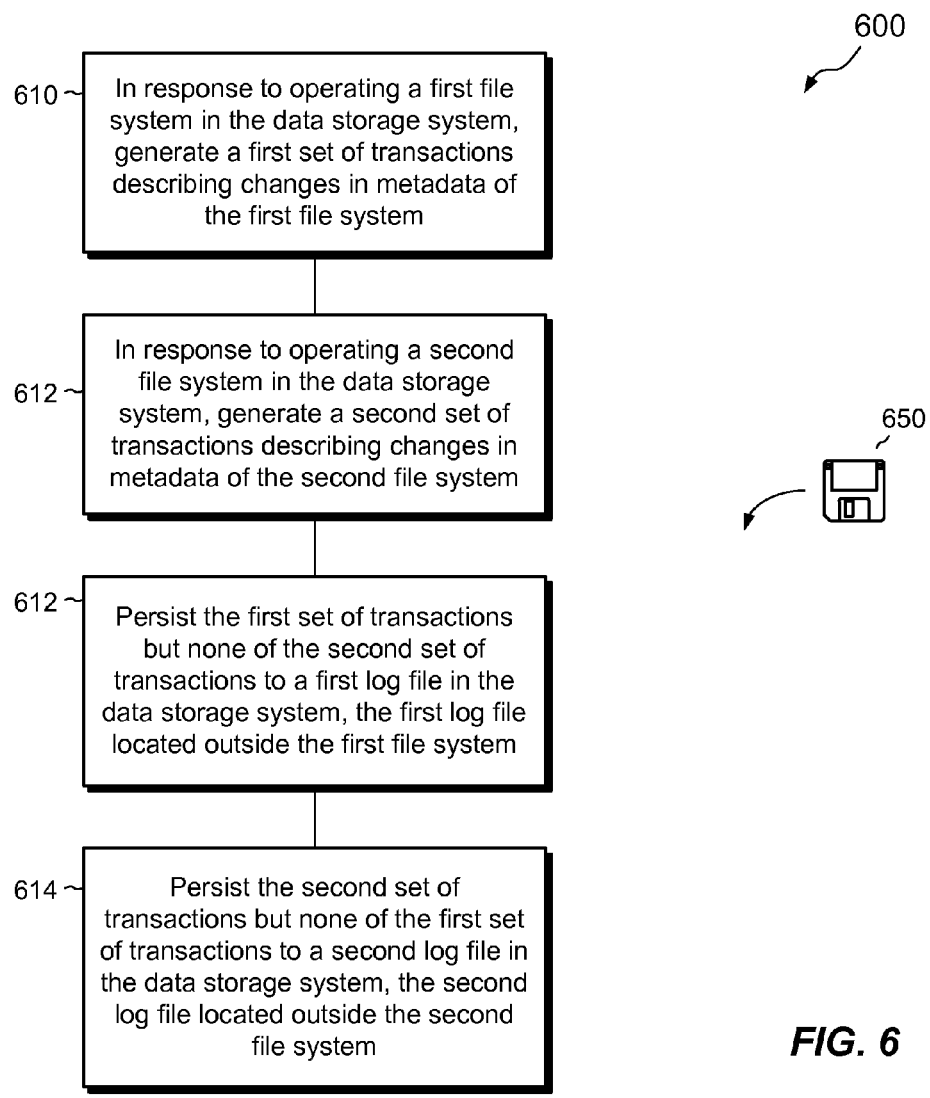
FIG. 6 is a flowchart showing an example process for managing transaction logging for file system metadata in the data storage system of FIG. 1.

FIG. 6 shows a process 600 that may be carried out in connection with the computing environment 100 and is typically performed by the software constructs described in connection with FIGS. 1, 2, and 4, which reside in the memory 126 and are run by the processing units 124. The various acts of the process 600 may be ordered in any suitable way. Accordingly, embodiments may be constructed in which acts are performed in an order different from that illustrated, which may include performing some acts simultaneously, even though the acts are shown as sequential in the illustrated embodiments.

At step 610, in response to operating a first file system in the data storage system, a first set of transactions is generated describing changes in metadata of the first file system. For example, the first data storage system 116a operates file system FS 1 and generates metadata changes, e.g., in response to requests 114 directed to FS 1.

At step 612, in response to operating a second file system in the data storage system, a second set of transactions is generated describing changes in metadata of the second file system. For example, the first data storage system 116a operates file system FS 2 and generates metadata changes, e.g., in response to requests 114 directed to FS 2.

At step 614, the first set of transactions but none of the second set of transactions is persisted to a first log file in the data storage system. The first log file is located outside the first file system. For example, the metadata transactions directed to FS 1 are persisted to Log 1, which is supported by file 154(1) and is a separate file from the file 134(1) supporting FS 1, but no metadata transactions for FS 2 are persisted to Log 1.

At step 616, the second set of transactions but none of the first set of transactions is persisted to a second log file in the data storage system. The second log file is located outside the second file system. For example, the metadata transactions directed to FS 2 are persisted to Log 2, which is supported by file 154(2) and is a separate file from the file 134(2) supporting FS 2, but no metadata transactions for FS 1 are persisted to Log 2.

An improved technique has been described, which overcomes the deficiencies of common transaction logs without requiring embedded logs. The improved technique operates by storing metadata transactions for multiple file systems of a data storage system in respective log files, such that each log file stores metadata transactions for a single file system only. The data storage system thus provides transaction log files on a per-file-system basis.

Having described certain embodiments, numerous alternative embodiments or variations can be made. For example, it has been shown and described that file-system-specific log files may be used in systems that do not support embedded transaction logs. However, nothing precludes a file system having a transaction log embedded in its file system metavolume from using file-system-specific log files instead. Indeed, some circumstances may favor the use of file-system-specific log files, as such files are not snapped when the file systems they support are snapped and thus are not susceptible to write splitting and storage fragmentation in the same way that snapped files may be. Systems using file-system-specific log files may thus benefit from more efficient access to transaction logs than can be provided by highly fragmented embedded logs.

Also, although techniques have been described for performing asynchronous replication between systems supporting file-system-specific log files and systems supporting common transaction logs, the same techniques may be used for performing asynchronous replication between two systems that each support file-system-specific log files.

Further, although the focus herein has been on asynchronous replication, nothing precludes the performance of synchronous replication between file systems having file-system-specific log files. For example, the metavolume supporting a file system (e.g., metavolume 132(1)) may be joined in a consistency group with the metavolume supporting a log file (e.g., 152(1)), and both volumes of the consistency group may be synchronously replicated together.

Further still, the improvements or portions thereof may be embodied as a computer program product including one or more non-transient, computer-readable storage media, such as one or more magnetic disks, magnetic tapes, compact disks, DVDs, optical disks, flash memories, Application Specific Integrated Circuits (ASICs), Field Programmable Gate Arrays (FPGAs), and the like (shown by way of example as medium 650 in FIG. 6). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of managing transaction logging for file system metadata in a data storage system, the method comprising:
   in response to operating a first file system in the data storage system, generating a first set of transactions describing changes in metadata of the first file system;
   in response to operating a second file system in the data storage system, generating a second set of transactions describing changes in metadata of the second file system;
   persisting the first set of transactions but none of the second set of transactions to a first log file in the data storage system, the first log file located outside the first file system; and
   persisting the second set of transactions but none of the first set of transactions to a second log file in the data storage system, the second log file located outside the second file system,
   wherein the data storage system includes a container file system,
   wherein the data storage system stores the first file system in a first file in the container file system, and
   wherein the data storage system stores the first log file in a second file in the container file system.

2. A method as in claim 1, further comprising:
   storing the first file system in a form of a container file within a set of container file systems of the data storage system; and
   storing the first log file within the set of container file systems of the data storage system.

3. A method as in claim 2, wherein storing the container file and storing the first log file include storing both the container file and the first log file as respective files in a single container file system.

4. A method as in claim 3, wherein the container file system stores container files for no file system other than the first file system.

5. A method as in claim 4, wherein the first file system is built upon a first file system metavolume that supports the first file system and no other file system, and wherein the method further comprises:
   pausing the operating of the first file system;
   syncing the first set of transactions stored from the first log file to establish the changes in the first file system metavolume;
   after syncing the first set of transactions, taking a snap of the first file system by snapping the first container file stored in the container file system; and
   resuming the operating of the first file system,
   wherein the snap thereby reflects the first file system in a consistent state.

6. A method as in claim 5, wherein taking the snap of the first file system does not result in a snap being taken of the first log file stored in the container file system.

7. A method as in claim 5, further comprising, after taking the snap of the first file system:
   accumulating a new set of transactions in the first log file describing new changes in the first file system's metadata since resuming the operating of the first file system;
   pausing the operating of the first file system;
   syncing the new set of transactions stored in the first log file to establish the new changes in the first file system metavolume;
   after syncing the new set of transactions, taking a second snap of the first file system;
   computing a difference between the snap and the second snap; and
   sending the difference to a second data storage system configured to store a replica of the first file system.

8. A method as in claim 7, wherein the second data storage system manages transaction logging for multiple file systems, including the replica of the first file system, with a common transaction log that persists metadata changes for the multiple file systems together.

9. A method as in claim 8, further comprising:
   operating a third file system in the data storage system, the third file system providing a replica of a source file system operating on the second data storage system, wherein the source file system is one of the multiple file systems whose transaction logging is managed with the common transaction log;
   storing the third file system in a form of a container file within another container file system of the set of container file systems of the data storage system;
   storing a third log file within the other container file system of the data storage system;
   receiving, from the second data storage system, a source-based difference between snaps of the source file system taken on the second data storage system;
   in response to receiving the source-based difference:
      pausing the operating of the third file system;
      taking a snap of the third file system to provide a stable version of the third file system;
      redirecting any read requests directed to the third file system to the snap of the third file system until the operating of the third file system is resumed;
      applying the received source-based difference to the third file system to update the third file system with recent changes made in the source file system; and after applying the received source-based difference, resuming the operating of the third file system.

10. A method as in claim 7, wherein the replica of the first file system on the second data storage system is built upon an underlying file system metavolume that includes a designated region for implementing a transaction log for persisting metadata transactions directed to the replica of the first file system.

11. A method as in claim 7, wherein the first file system metavolume on the data storage system includes a designated region configured to implement a transaction log for persisting metadata transactions directed to the first file system, but wherein the data storage system uses the first log file in place of the designated region for persisting changes in the metadata of the first file system.

12. A method as in claim 3, further comprising mapping the first log file stored in the container file system to a contiguously addressable range of storage in an underlying storage volume.

13. A method as in claim 12, wherein mapping the first log file stored in the container file system to the contiguously addressable range of storage in the underlying storage volume includes performing a predetermined computation to directly compute offsets into the contiguously addressable range of storage based on offsets into to the first log file.

14. The method of claim 1,
wherein the data storage system includes a second container file system,
wherein the data storage system stores the second file system in a first file in the second container file system, and
wherein the data storage system stores the second log file in a second file in the second container file system.

15. A data storage system, comprising:
a set of processing units; and
memory, coupled to the set of processing units to form control circuitry, the control circuitry constructed and arranged to:
  in response to operation of a first file system in the data storage system, generate a first set of transactions describing changes in metadata of the first file system;
  in response to operation of a second file system in the data storage system, generate a second set of transactions describing changes in metadata of the second file system;
  persist the first set of transactions but none of the second set of transactions to a first log file in the data storage system, the first log file located outside the first file system; and
  persist the second set of transactions but none of the first set of transactions to a second log file in the data storage system, the second log file located outside the second file system,
wherein the data storage system includes a container file system,
wherein the data storage system stores the first file system in a first file in the container file system, and
wherein the data storage system stores the first log file in a second file in the container file system.

16. A data storage system as in claim 15, wherein the control circuitry is further constructed and arranged to map the first log file stored in the container file system to a contiguously addressable range of storage in an underlying storage volume.

17. A data storage system as in claim 16, wherein the control circuitry is further constructed and arranged to perform a predetermined computation to directly compute offsets into the contiguously addressable range of storage based on offsets into to the first log file.

18. A computer program product including a set of non-transitory computer readable media storing instructions which, when executed by a set of processing units of a data storage system, cause the set of processing units to perform a method of managing transaction logging for file system metadata in a data storage system, the method comprising:
  in response to operating a first file system in the data storage system, generating a first set of transactions describing changes in metadata of the first file system;
  in response to operating a second file system in the data storage system, generating a second set of transactions describing changes in metadata of the second file system;
  persisting the first set of transactions but none of the second set of transactions to a first log file in the data storage system, the first log file located outside the first file system; and
  persisting the second set of transactions but none of the first set of transactions to a second log file in the data storage system, the second log file located outside the second file system,
wherein the data storage system includes a container file system,
wherein the data storage system stores the first file system in a first file in the container file system, and
wherein the data storage system stores the first log file in a second file in the container file system.

19. A computer program product as in claim 18, wherein the first file system is built upon a first file system metavolume that supports the first file system and no other file system, and wherein the method further comprises:
  pausing the operating of the first file system;
  syncing the first set of transactions stored in the first log file to establish the changes in the first file system metavolume;
  after syncing the first set of transactions, taking a snap of the first file system by snapping the first container file stored in the container file system; and
  resuming the operating of the first file system;
  accumulating a new set of transactions in the first log file describing new changes in the first file system's metadata since resuming the operating of the first file system;
  pausing the operating of the first file system;
  syncing the new set of transactions stored in the first log file to establish the new changes in the first file system metavolume;
  after syncing the new set of transactions, taking a second snap of the first file system;
  computing a difference between the snap and the second snap; and
  sending the difference to a second data storage system configured to store a replica of the first file system.

20. A computer program product as in claim 19, wherein the replica of the first file system on the second data storage system is built upon an underlying file system metavolume that includes a designated region for implementing a transaction log for persisting metadata transactions directed to the replica of the first file system.

21. A computer program product as in claim 19, wherein the first file system metavolume on the data storage system includes a designated region configured to implement a transaction log for persisting metadata transactions directed to the first file system, but wherein the data storage system uses the first log file in place of the designated region for persisting changes in the metadata of the first file system.

* * * * *